3,287,141
WERNER CHROMIUM COMPLEXES AND
METHODS FOR THEIR PREPARATION
Adam A. Bartz, Wilmington, Del., assignor to E. I. du
Pont de Nemours and Company, Wilmington, Del., a
corporation of Delaware
No Drawing. Filed Aug. 5, 1965, Ser. No. 477,605
9 Claims. (Cl. 106—13)

This application is a continuation-in-part of application Serial No. 238,001 filed November 15, 1962, now abandoned.

This invention relates to the preparation of Werner complexes of chromium and a carboxylic acid containing substituted polar groups.

According to this invention, a Werner complex of chromium and a carboxylic acid containing substituted polar groups is obtained by reacting, in a suitable organic solvent, basic chromic chloride and a carboxylic acid containing substituted polar groups while excluding water above a maximum tolerable limit of about 6% by weight based on the total weight of the reaction mass, followed by admixing water with the reaction mass to provide a total water content of from about 8 to 50 weight percent, and then heating the resulting admixture at a temperature in the range from about 35° to about 70° C. for a period of about 20 to 75 minutes.

Among the carboxylic acids containing substituted polar groups which can be used to advantage in the process of the invention are the halogenated carboxylic acids of the formula (1)  $R(CX_2)_nCOOH$ where R is a member of the group consisting of hydrogen, trifluoromethyl and chlorodifluoromethyl, X is a halogen of the group consisting of fluorine and chlorine, n is a positive integer of at least 4, with the proviso that (a) when R is trifluoromethyl all of the halogen atoms must be fluorine, (b) when R is chlorodifluoromethyl at least two-thirds of the halogen atoms must be fluorine, and (c) when R is hydrogen at least half of the halogen atoms must be fluorine and n must be divisible by 2.

Illustrative of some of the useful halogenated carboxylic acids of Formula 1 there can be named Perfluorohexanoic acid
Dodecafluoroheptanoic acid
Hexadecafluorononanoic acid
Eicosafluoroundecanoic acid
Tetracosafluorotridecanoic acid
Tridecafluoroheptanoic acid
Heptadecafluoropelargonic acid
Nonadecafluorocapric acid
Heneicosafluoroundecoic acid
Tricosafluorolauric acid
Pentacosafluorotridecoic acid
Heptacosafluoromyristic acid
Nonacosafluoropentadecoic acid
Hentriacontafluoropalmitic acid
Tritriacontafluoromargaric acid
Pentatricontafluorostearic acid
Dotricontafluoroheptodecanoic acid
Tetracontafluoroheneicosanoic acid
Octafluorooctachloronononanoic acid
Hexafluorohexachloroheptanoic acid
Alpha, alpha, beta, gamma, gamma, delta epsilon, epsilon-octa-fluoro-beta, gamma, epsilon-trichlorohexanoic acid
Alpha, alpha, beta, gamma, gamma-pentafluoro-beta, gamma-dichlorobutanoic acid Other carboxylic acids that can be used and which contain substituted polar groups are perfluorobutyric acid, perfluorooctanoic acid, perchlorocaprylic acid, alpha-aminocaprylic acid, alpha-hydroxycaprylic acid, alpha-hydroxy stearic acid, perfluorocyclohexane-carboxylic acid, nitrobenzoic acid (ortho-, meta-, and para-), nitrocinnamic acid (ortho-, meta-, and para-), and p-nitrophenylacetic acid.

By basic chromic chloride is meant the known chemical $Cr(OH)Cl_2$ which can be produced by conventional methods.

The reaction medium can be any suitable organic solvent for the reactants with particularly preferred results being obtained when the solvent or at least a major portion, i.e., at least 60 and preferably at least 75% by weight, of the solvent is a monohydric aliphatic alcohol of not more than 4 carbon atoms. Suitable alcohols include for example methanol, ethanol, n-propanol, isopropanol, n-butanol, sec.-butanol, tert.-butanol and isobutanol. Of these, isopropanol is highly preferred. The alcohol concentration is not critical and for convenience from 1 to 20 parts by weight of alcohol per part of chromic chloride is suitable.

The water content is critical at all times. It is essential up to and including the reaction between the basic chromic chloride and the carboxylic acid that the water concentration, including added water as well as water found in situ, be maintained below 6% and preferably in the range from 3 to 4%. Water present in excess of about 6% at the time of the chromic chloride reaction with the acid for some reason precludes production of my novel complexes.

It is also critical that, following formation of the reaction product of the chromic chloride and the acid, the water content of the mass be adjusted upwardly to within the range from about 8% to about 50% by weight. Preferably the water content will at this time be adjusted below 50% and particularly advantageous results are obtained in the range from 15 to 30%.

Following the adjustment of water concentration as just mentioned, the mass is heated at 35° to 70° C. for 20 to 75 minutes. It will be understood that at the higher temperatures within the prescribed ranges the shorter heating times will be satisfactory and vice versa. This heat treatment is according to this invention important to achieve the outstanding performance characteristics of my complexes. Preferred heat treatment is at about 45° C. for 30 minutes. The product formed in accordance with the above-described method of preparation is therefore a composition containing about 8% to 50% by weight total water; the novel Werner complex characterized hereinbelow; and the remainder of said composition being the organic reaction solvent which preferably consist of a monohydric aliphatic alcohol or mixture of alcohols having 1 to 4 carbon atoms. It is to be understood, of course, that included with the alcohol or alcohols will be oxidation products thereof resulting from the reduction of chromyl chloride in the presence of said alcohol(s), (e.g. the corresponding ketone(s) of said alcohol(s)).

It will be recognized that the essential way in which my process differs from known processes is the critical admixture of water in my process, not before, but after the chromic chloride-acid reaction takes place, followed by the heating step as described.

In a preferred continuous process, the basic chromic chloride used for reaction with the carboxylic acid is produced by reduction of anhydrous chromyl chloride with a monohydric aliphatic alcohol. It is therefore convenient to use the resulting solution of the basic chromic chloride in the alcohol to continue this invention by admixture with the acid. The anhydrous chromyl chloride in turn could be made by reaction of chromium trioxide, sulfuric acid and hydrochloric acid under substantially anhydrous conditions according to known methods.

The Werner complex reaction products produced by my above process are novel and possess outstanding properties. In this art of Werner complex chromium compounds, the halogenated carboxylic acid derivative complexes and the other complexes derived from carboxylic acids which contain substituted polar groups are well recognized as a class separate and distinct from also highly useful complexes obtained from monocarboxylic acids not having the specified substituted polar groups.

My complexes are coordination complexes of the Werner type in which a basic trivalent nuclear chromium atom is coordinated with the carboxylic acido group of the described substituted acid. The complexes are completely miscible in all proportions in water and polar organic solvents.

The complexes have a basicity of 33⅓%. The ratio of chromium atoms to acido groups in the complexes is in the range from 1:1 to 10:1 and preferably from 2:1 to 5:1. The complexes are neutralizable with strong base such as sodium hydroxide to a pH as high as 4.5 without dissociation or precipitation of solids. My complexes have a ratio of coordinated water to chromium atoms in the range of from at least 2:1 up to 4:1.

The term "coordinated water" means a water molecule or its resulting dissociation product, the hydroxyl group, occupying a coordination site on a chromium atom of the complex. It is well known in the art that each chromium atom in such a complex has six available coordination sites. In the case of a complex prepared with a ratio of chromium to acido groups of 2 to 1 and the complexes prepared from monobasic chromium compound [Cr(OH)Cl$_2$], 1 site is occupied by the OH radical from the basic chromic chloride starting material and 1 by an oxygen from the carboxyl group of the organic group. In my novel complexes all or at least two of the remaining sites are filled by water molecules, or the resulting hydroxyl dissociation product.

In the case of prior art complexes, these four remaining coordinating sites are filled by either chloride or organic solvent ligands, any water formed in sites or added during or after reaction being present in the solvent medium for the complex.

Due to the significant amount of water molecular present in the coordinated sites of chromium in my complexes, my complexes are characterized by chromium atoms, interpolymerized through hydroxyl and oxygen bridges and as a result possess quite uniqe properties.

My complexes are particularly useful for application to the surface of paper and fabrics to give a highly water repellent coating. No subsequent curing step is needed following application as is now prevalent with prior art complexes. My complexes can be used in small amounts with great savings compared to conventional products. My complexes can also be used as a spray coating for glass such as windows as an aid in frost removal. For example a pane of glass coated with my material will frost at freezing temperatures but completely clear up for an indefinite period merely by washing with water.

This invention will be better understood by reference to the following illustrative Examples:

EXAMPLE 1

One hundred parts by weight of solid basic chromic chloride containing 40.1% chromium and 6.5% water is added to a mixture of 472 parts of isopropanol and 58 parts of water. The mass is then heated to reflux to assist in the dissolution of the solid basic chromic chloride. The mixture is cooled and 88 parts of perfluorooctanoic acid are added and the entire mass heated for a period of 70 minutes at a temperature of 40° C. for complexing. An additional 10 parts of water is then added and the mass heated for 45 minutes at 45° C.

The resulting solution of perfluorooctanato chromic chloride in aqueous isopropanol is stable against gel formation upon standing. A dilute solution of this material is prepared by adding 10 parts of this solution to 990 parts of water. The pH of the resulting dilute solution is then adjusted to 4.5 using 4% aqueous sodium hydroxide. A sheet of 42 pound Kraft paper is submerged in the dilute solution until the wet pickup amounts to 75–80%. The sheet is then dried and shows excellent water repellency in standard tests.

EXAMPLES 2–17

The preceding Example is repeated substituting like amounts of the acids of the following Examples for the acid of Example 1, with similarly excellent results.

| Example: | Complexing acid |
|---|---|
| 2 | Perfluorohexanoic acid. |
| 3 | Dodecafluoroheptanoic acid. |
| 4 | Hexadecafluorononanoic acid. |
| 5 | Eicosafluoroundecanoic acid. |
| 6 | Tetracosafluorotridecanoic acid. |
| 7 | Tridecafluoroheptanoic acid. |
| 8 | Heptadecafluoropelargonic acid. |
| 9 | Nonadecafluorocapric acid. |
| 10 | Heneicosafluoroundecoic acid. |
| 11 | Tricosafluorolauric acid. |
| 12 | Pentacosafluorotridecoic acid. |
| 13 | Heptacosafluoromyristic acid. |
| 14 | Nonacosafluoropentadecoic acid. |
| 15 | Hentriacontafluoropalmitic acid. |
| 16 | Tritriacontafluoromargaric acid. |
| 17 | Pentatricontafluorostearic acid. |

These and other examples can, of course, be repeated using other times, temperatures and other process variables within the ranges clearly taught above, with similarly satisfactory results.

I claim:

1. A composition of a Werner complex stable against gel formation having a total water content of from 8 to 50% by weight water, the remainder consisting essentially of (a) a Werner complex of chromium and a carboxylic acid containing substituted polar groups having a basicity of 33⅓%, a ratio of chromium atoms to acido groups from 1:1 to 10:1, and said complex being further characterized by having a ratio of coordinated water to chromium atoms of from at least 2:1 up to 4:1; and (b) a monohydric aliphatic alcohol containing 1 to 4 carbon atoms.

2. A composition as set forth in claim 1 wherein said carboxylic acid of said Werner complex is perfluorooctanoic acid.

3. A composition as set forth in claim 1 wherein said carboxylic acid of said Werner complex is perfluorohexanoic acid.

4. A composition as set forth in claim 1 wherein said carboxylic acid of said Werner complex is heptacosafluoromyristic acid.

5. In a process of reacting basic chromic chloride and a carboxylic acid containing substituted polar groups in a solvent medium, the improvement comprising in combination (1) carrying out said reacting while excluding water above a maximum tolerable limit of about 6% by weight based on the total weight of the reaction mass, followed by (2) admixing water with the reaction mass to provide a total water content of from about 8 to 50 weight percent, and (3) heating the resulting admixture at a temperature in the range from about 35° to about 70° C. for a period of about 20 to 75 minutes.

6. Process as set forth in claim 5 wherein said carboxylic acid is perfluorooctanoic acid.

7. Process as set forth in claim 5 wherein said carboxylic acid is perfluorohexanoic acid.

8. Process as set forth in claim 5 wherein said carboxylic acid is heptacosafluoromyristic acid.

9. A Werner complex of chromium and a carboxylic acid containing substituted polar groups having a basicity of 33⅓%, a ratio of chromium atoms to acido groups from 1:1 to 10:1, and said complex being further characterized and having the ratio of coordinated water to chromium atoms of from at least 2:1 to 4:1.

No references cited.

CHARLES B. PARKER, *Primary Examiner.*

ANTON H. SUTTO, *Assistant Examiner.*